United States Patent

Maes et al.

[11] Patent Number: 5,877,568
[45] Date of Patent: *Mar. 2, 1999

[54] ROTOR POSITION SENSING SYSTEM

[75] Inventors: Gregory R. Maes, Ballwin; Raymond D. Heilman; James L. Skinner, both of Florisant, all of Mo.; Steven P. Randall, Leeds, United Kingdom

[73] Assignee: Emerson Electric Co., St. Louis, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 657,690

[22] Filed: May 31, 1996

[51] Int. Cl.⁶ .................................................. H02K 11/00
[52] U.S. Cl. ............................................................ 310/68 B
[58] Field of Search ................................ 310/68 B, 261, 310/89; 318/138, 254, 439; 324/174, 173, 175, 207.2, 207.25; 73/494, 514.39, DIG. 3, DIG. 11

[56] References Cited

U.S. PATENT DOCUMENTS

| | | | |
|---|---|---|---|
| 4,011,478 | 3/1977 | Beard | 310/DIG. 2 |
| 4,158,172 | 6/1979 | Boyer et al. | 324/175 |
| 4,847,527 | 7/1989 | Dohogne | 310/68 B |
| 4,970,423 | 11/1990 | Tamae et al. | 310/68 B |
| 5,010,283 | 4/1991 | Murata | 310/68 B |
| 5,591,019 | 1/1997 | Brown | 417/422 |
| 5,719,496 | 2/1998 | Wolf | 324/174 |
| 5,729,128 | 3/1998 | Bunyer et al. | 324/174 |

FOREIGN PATENT DOCUMENTS

| | | | |
|---|---|---|---|
| 3-215147 | 9/1991 | Japan | 310/68 B |
| 3-222653 | 10/1991 | Japan | 310/38 B |

OTHER PUBLICATIONS

Schematic Drawing of BESAM Motor, Apr. 1996.

*Primary Examiner*—Clayton LaBalle
*Attorney, Agent, or Firm*—Arnold, White & Durkee

[57] ABSTRACT

An improved rotor position sensing system for detecting the angular position of the rotor of a rotating machine with respect the stator of the machine that includes a shutter that is affixed to the rotor, a sensor board holder that is positioned within the stator such that it has known orientation with respect to the stator, and a sensor board including rotor position sensors that is positioned within the sensor board holder such that it has a known orientation with respect to the holder.

21 Claims, 6 Drawing Sheets

ROTOR POSITION SENSING SYSTEM

FIELD OF THE INVENTION

This invention relates to rotating machines in general and, in particular, to rotating machines in which the angular position of the rotor with respect to the stator must be known for positioning or control purposes. Specifically, the present invention relates to a system for detecting the angular position of the rotor of a rotating machine with respect to the stator.

BACKGROUND OF THE INVENTION

Most rotating machines comprise a stationary member, commonly referred to as a stator, and a rotating member, known as a rotor, that rotates with respect to the stator. For many rotating machines information concerning the angular position of the rotor with respect to the stator is critical for proper machine operation. Positioning systems need such information to allow for accurate positioning of elements that are coupled to the rotor. Other types of machine systems, e.g., systems including switched reluctance machines and certain types of brushless permanent magnet machines use rotor position information to control the energization of the phase windings within the stator.

Rotor position information is typically provided by a rotor position transducer that comprises a stationary element containing one or more sensors, and a rotating element that is coupled to the shaft of the rotor such that it rotates with the rotor. The rotating element, commonly known as a "shutter," typically comprises one or more elements that interact with the sensors, such that the outputs from the sensors provide an indication of the angular position of the rotor with respect to the stator. For example, a shutter may comprise a number of outwardly extending "shutter teeth" that pass through optical sensors to provide information concerning the angular position of the rotor.

In known rotating machine systems the active portion of the rotor and the stator is enclosed in a motor housing that includes "end-shields" at the end of the housing. Such end-shields typically include a hole through which the shaft of the rotor passes and a recess that holds bearing structures that allow the rotor to smoothly rotate within the stator. In known systems a sensor board comprising a printed circuit board containing rotor position sensors is typically mounted directly to the end-shield of the motor in some fashion such that the sensors project inward into the motor housing (when the sensor board is positioned on the end-shield such that it is inside the motor housing when the end-shield is in place) or outward from the motor housing (when the sensor board is positioned on the end-shield such that it is outside the motor housing when the sensor board is in place).

Because rotor position information can be critical to proper operation, sophisticated alignment techniques are commonly employed to ensure that the sensor board is properly positioned with respect to the end-shields, that the end-shield is properly positioned with respect to the motor housing, and that the motor housing is properly positioned with respect to the stator. These complex alignment techniques increase the manufacturing costs and the manufacturing overhead associated with motors using such rotor position sensor. Moreover, these alignment techniques are not always accurate and can result in some misalignment of the sensor board with respect the stator, which may degrade the performance the motor.

Still further, the alignment techniques provide some tolerances that while individually small, may combine to significantly diminish motor performance. For example, the stator is positioned within the motor housing to a position within a first given tolerance level of a desired stator position. The sensor-board is then positioned on the end-shield within a second given tolerance of a desired sensor-board position. The end-shield is then mounted to the main motor housing within a third tolerance level of a desired end-shield position. While each of the stator, sensor board, and end-shield are positioned within tolerance, the overall positioning of the sensor board's sensors with respect to the stator may differ from the desired position by such an amount that motor performance is degraded. Thus, there is an "accumulative tolerancing" problem with such systems.

Another drawback with standard rotor position sensors where the sensor board is mounted to the end-shield involves servicing of the motors after they are in the field. For many motors there are certain elements (e.g., the bearing structures) that are necessarily within the enclosed rotor housing that may require service in the field. To reach these elements, the end-shield must be removed from the rotor housing. Because accurate positioning of the sensor board on the end-shield with respect to the motor housing is critical, the replacement of the end-shield is not a simple matter and often involves complex realignment techniques and apparatus. When such techniques are not followed, or are improperly performed by the service technician, the relative position of the sensor board with respect to the stator may change slightly, producing a misalignment that results in degraded motor performance.

Known rotor position sensors also suffer from limitation associated with the positioning of the shutter with respect to the rotor. In many systems the shutter is simply affixed to the shaft of the machine within a given tolerance level of a desired shutter position. This can further exacerbate the compounded tolerancing problem discussed above. Moreover, in systems where the shutter is mounted outside the motor housing, the shutter will typically have to be removed when servicing of elements within the motor housing is required, thus requiring realignment—and potential miss-alignment—of the shutter with the rotor upon re-assembly It is an object of the present invention to overcome these and other limitations of known systems by providing an improved rotor position sensing system that allows for accurate positioning of the sensor elements with respect to the stator in a manner that is less sensitive to tolerance and field service problems than known systems; that is easier to manufacture than known systems; and that allows the angular position of the rotor with respect to the stator to be determined more accurately than with known systems.

SUMMARY OF THE INVENTION

In accordance with one exemplary embodiment of the present invention an improved rotor position sensing system is disclosed for a rotating machine including a stator. The exemplary rotor position sensing system includes a sensor holder that is coupled to a sensor where the sensor holder is affixed to the stator in such a manner that the sensor holder, and thus the sensor, is easily and economically orientated with respect to the stator.

In one specific exemplary embodiment, a rotating machine system is disclosed that includes a rotating machine having a motor housing, a stator positioned with the motor housing, the stator defining a bore, a rotating shaft positioned within the bore, a rotor affixed to the shaft, the rotor being positioned within the bore, and end-shields affixed to the motor housing, the end-shields and the housing defining a cavity that contains the rotor and the stator. A shutter is affixed to the shaft within the cavity defined by the motor housing and the end-shields. A sensor holder is affixed to the stator where the sensor holder includes at least one sensor for interacting with the shutter to provide rotor position information. In this embodiment, the sensor holder is affixed to the stator within the cavity defined by the motor housing and the end-shields.

In a further embodiment of the system described above, the rotor of the rotating machine defines a plurality of outwardly extending rotor teeth and the shutter comprises at least one pair of extending guide members where the pair of extending guide members defines a notch that receives one of the rotor teeth such that the shutter is in a predetermined position with respect to the rotor.

In a still further embodiment of the exemplary system described above, the stator defines a plurality of stator slots and the sensor holder defines a plurality of projections, where the projections of the sensor holder are adapted to be nested within slots of the stator to position the sensor holder with respect to the stator in a predetermined manner.

Other features of these, and other, embodiments of the present invention are illustrated in the figures accompanying this description and are explained in the following specification.

BRIEF DESCRIPTION OF THE DRAWINGS

Similar reference characters indicate similar parts throughout the several views of the drawings.

DETAILED DESCRIPTION OF THE INVENTION

Figure 1:
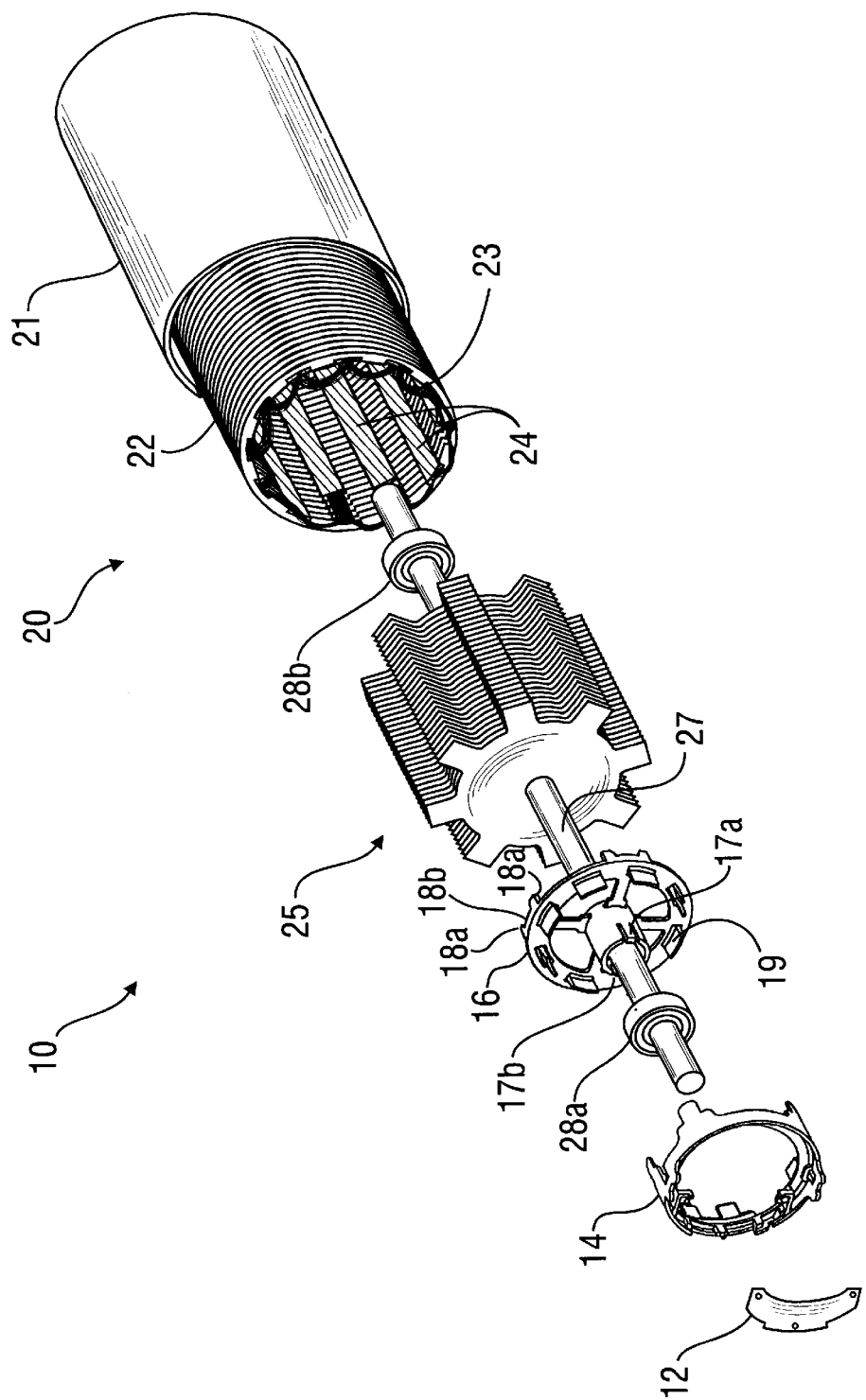
FIG. 1 illustrates an exemplary rotor position sensing system 10 in accordance with the present invention that includes a sensor board, a sensor board holder and a shutter.

Turning to the drawings and, in particular FIG. 1, an improved rotor position sensing system 10 is illustrated. In general the rotor position sensing system 10 comprises a sensor board 12, a sensor board holder 14, and a shutter 16. The sensor board holder 14 and the shutter 16 may be formed of a glass filled thermoplastic polymer or any other suitable material. The rotor positioning sensing system 10 illustrated in connection with a switched reluctance motor 20, is although it is to be understood that the rotor position sensing system may be used with other types of motors including brushless permanent magnet motors, induction motors, and the like.

The reluctance motor 20 includes a motor housing 21 that surrounds a stator 22, which comprises a stack of identical laminations, each of which defines twelve inwardly extending stator poles. A plurality of copper coils 23 are positioned within the inter-pole regions of the stator, commonly referred to as the stator slots, and the coils are electrically connected in a suitable fashion to form the phase windings of a reluctance machine. In the embodiment of FIG. 1, strips of Mylar film 24 are positioned over the portions of copper coils 23 that would otherwise be exposed along the inward surface of the stator 22. Other forms of coverings, such as the coverings known as "top sticks", may be used in place of the Mylar film strips 24.

The reluctance machine 20 also includes a rotor 25 that comprises a stack of rotor laminations affixed to a shaft 27. For the reluctance machine 20 of FIG. 1, each of the rotor laminations defined eight outwardly extending rotor poles. Two bearing structures 28a and 28b are fixedly positioned on the rotor according to known methods to allow the rotor 25 to freely rotate when the bearing structures 28a and 28b are properly positioned within the cavity defined by the end-shields of the reluctance machine (not illustrated) and the motor housing 21.

In the embodiment of FIG. 1, all of the elements of the exemplary rotor position sensing system (e.g., the sensor board 12, the sensor board holder 14 and the shutter 16) are positioned within the cavity defined by the end-shields of the reluctance machine (not illustrated) and the motor housing 21.

The shutter 16 includes a central portion defining a bore through which the shaft 27 of the rotor 25 passes. Tang members 17a and 17b extend from the central bore in a direction along the shaft to hold the shutter 16 in place along the shaft 27 during the assembly process. In that process, the rotor laminations are first positioned on shaft 27 and then the shutter 16 is positioned on the shaft 27 in an abutting relationship with the rotor 25. The bearing structure 28a is then affixed to the shaft 27 such that it holds the shutter 16 in place against the rotor.

Extending in a direction co-axial with the shaft 27 but opposite the direction of tang members 17a and 17b are a plurality pairs of extending rotor guide members 18a, where each pair of rotor guide members form a notch 18b. Only one pair of guide members 18a and one notch 18b is labeled in FIG. 1. When the shutter 16 is positioned in an abutting relationship with the rotor 25, the poles of the rotor fit in the notch 18b such that guide members 18a are positioned on either side of the rotor poles. In the embodiment of FIG. 1 the shutter 16 has four sets of guide members 18a, such that four rotor poles are received in notches 18a and surrounded by guide members 18b when the shutter 16 is positioned against the rotor 25. Alternate designs are envisioned wherein a fewer or greater number of guide members 18a are used.

Extending in a direction co-axial with the shaft and in the same direction as tang members 17a and 17b are a plurality of shutter teeth 19. As explained in more detail below, the shutter teeth 19 interact with position sensors to provide information representative of the angular position of the rotor with respect to the stator. Because of the nature of the guide members 18a ensures that the shutter 16 will have a fixed and known position with respect to the rotor 25, the shutter teeth 19 can provide an accurate indication of the position of the rotor.

Figure 2:
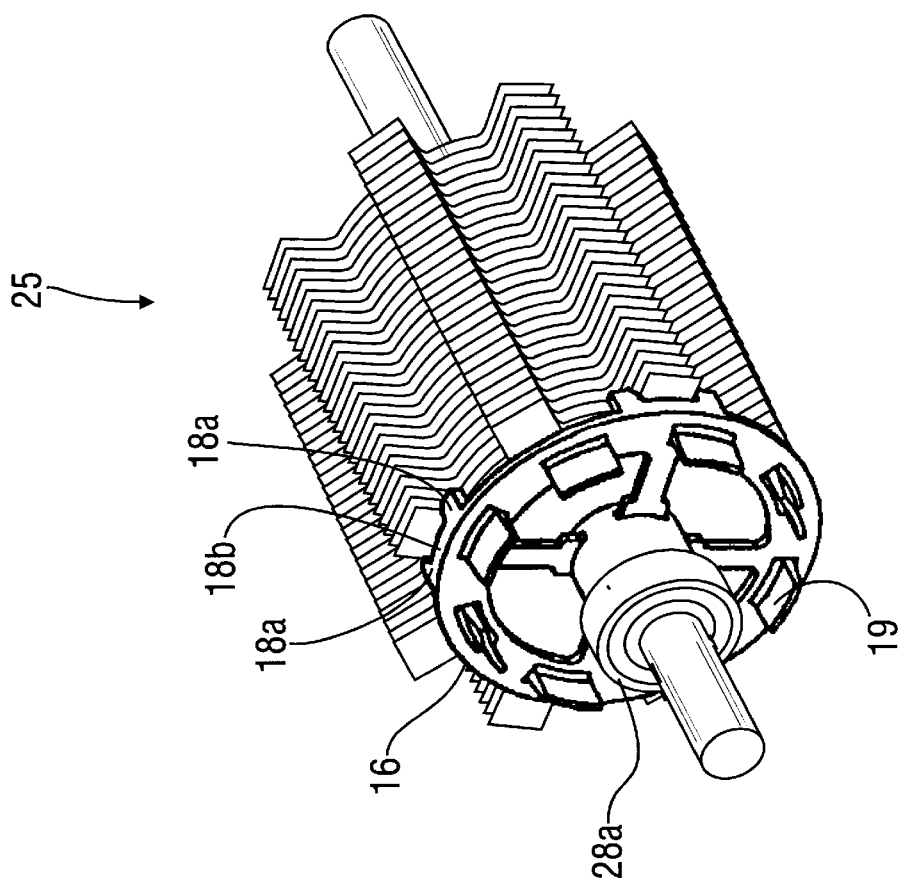
FIG. 2 illustrates the manner in which the rotor of a reluctance machine, the shutter of the improved rotor position sensing system 10 and a bearing structure may be positioned upon final assembly.

FIG. 2 illustrates in greater detail the manner in which the rotor 25, the shutter 16 and the bearing structure 28a are positioned upon final assembly of the device of FIG. 1. As illustrated, the shutter 16 is held in an abutting relationship with the rotor 25 by the bearing structure 28a which surrounds and at least partially covers the tang members 17a and 17b. The notches 18b formed by the rotor guide members 18a receive the rotor pole projections such that the shutter 16 is held in a fixed and section relationship with respect to the rotor. Moreover, the positioning of the four sets of guide members 18a and the notches 18b, ensures that the shutter 16 is properly oriented with respect to the rotor 25. With rotors having greater or fewer rotor poles than the exemplary rotor 25 of FIGS. 1 and 2, additional sets of guide members 18a and notches 18b may be required to ensure proper orientation of the shutter 16 with respect to the rotor 25.

Because of the construction of shutter 16, the manufacture of the rotor 25/shutter 16 assembly may be carried out in an a rapid and economical manner without the need for time consuming and costly orientation steps.

Referring back to FIG. 1, the rotor 25/shutter 16 assembly is positioned within the core of the stator 23 in a traditional manner. The sensor board holder 14 then fits over bearing structure 28a and shutter 16 and partially into the spaces defined by the slots of stator 23 such that the sensor board holder 14 is held in a generally press-fit relationship with the stator 22. The sensor board 12 is affixed to the holder 14 such that attachment of the sensor board holder 14 to the stator 22 orientates the sensor board 12 to the stator 22 in a fixed and known manner. The construction of the sensor board holder 14 and the manner in which it is oriented with respect to the stator 22 and the sensor board 12 is illustrated in greater detail in FIGS. 3A–3D.

Figure 3A:
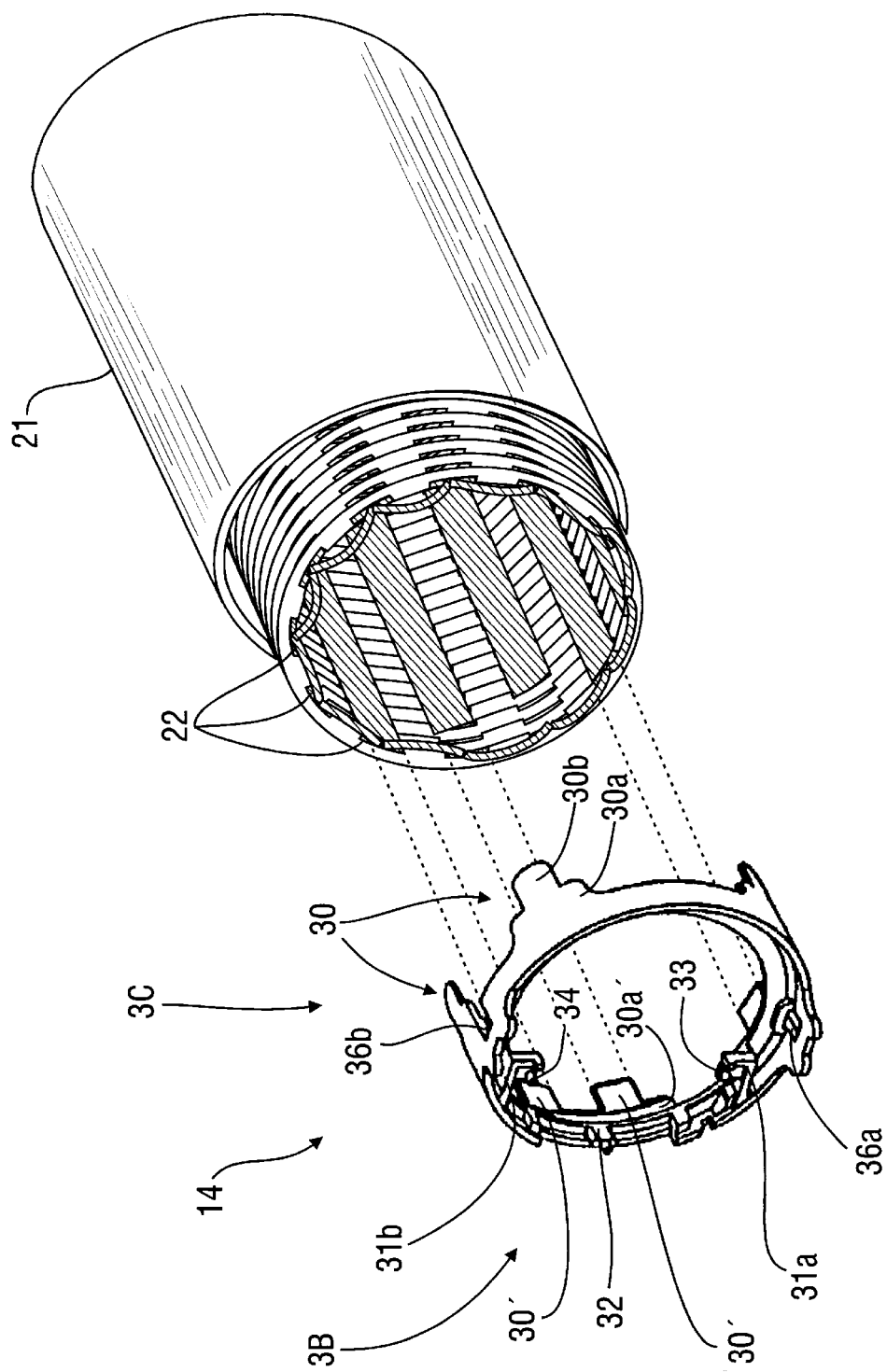
FIGS. 3A–3D illustrate details of an exemplary construction of a sensor board holder in accordance with the present invention and the manner in which it may be oriented with respect to a sensor board and the stator of a reluctance machine.

Referring to FIG. 3A, the sensor board holder comprises a molded or machined part that may be constructed, as indicated above, from a suitable glass field thermoplastic polymer or any other suitable material. In general, the sensor board holder 14 includes a circular portion defining a plurality of outward projections 30 where each of the projections consists of a first portion of a first width 30a and a second portion of a second width 30b, where the first width is wider than the second and where the second width is such that the second portion 30b of each projection 30 can be received in one of the slots of the stator 22. Two of the projections 30' are positioned adjacent one another such that they share a common first portion 30a'. In the embodiment of FIG. 3A–3D, the sensor board holder includes six outward projections 30. In the exemplary embodiment, the number of projections 30 is less than the number of slots defined by the stator.

Figure 3C:
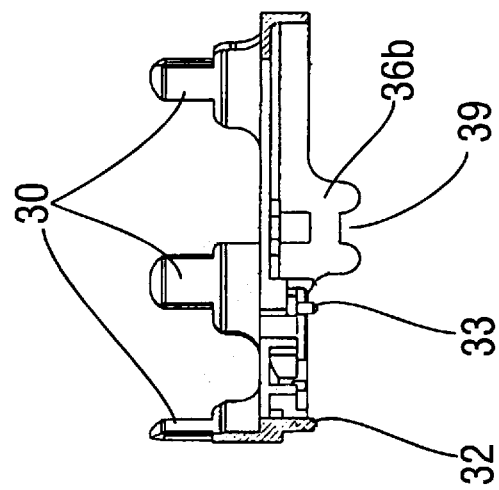
Figure 3B:
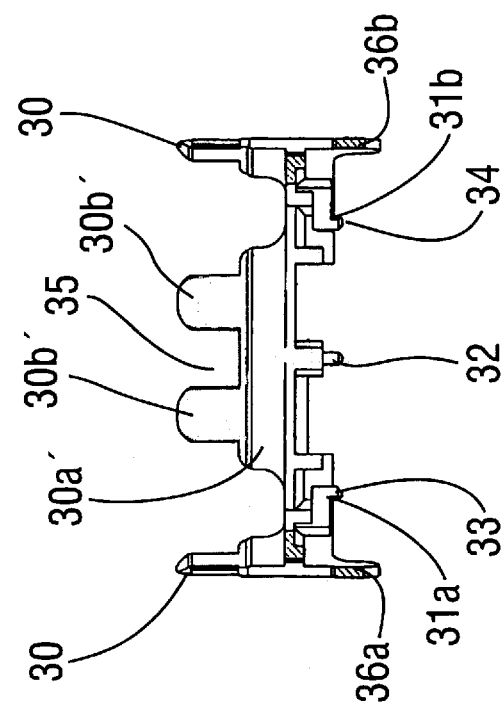

Referring to FIG. 3B it may be noted that the projections 30b' define a notch 35. The notch 35 has a width slightly greater than, but approximately equal to, the width a stator pole. If one of the poles of the stator 22 is selected as a "reference" pole, and the holder 16 is positioned with respect to the stator 22 such that the notch 35 receives the reference pole, the holder 16 will have a known orientation, and be in a known position, with respect to stator 22. Thus, the use of notch 35 allows for proper orientation of the holder 16 with respect to the stator 22 without complex alignment techniques and/or expensive alignment apparatus. Other techniques of properly orienting holder 16 with respect to the stator are envisioned, e.g., selecting a reference projection 30 to be inserted into a reference stator slot.

Extending in a direction generally opposite that of projections 30 are sensor board guide members 31a and 31b and positioning posts 32,33 and 34. The guide members 31a and 31b are configured such that they can receive and partially support a sensor board 12. In the illustrated embodiment, the guide members 31a and 31b are integrally formed with the sensor board holder 16. The positioning posts 32, 33 and 34 are arranged such that they can be received by appropriately sized holes 42, 43 and 44 formed in the sensor board 12. In affixing the sensor board 12 to the holder 14, the board 12 may be positioned with respect to the holder 14 such that the board fits within the guide members 31a and 31b and the holes in the board 42–44 receive the positioning posts 32–34. The board 14 may be affixed to the holder by any suitable means, including by heat staking the board 14 to the holder 16 by heating and partially melting the positioning posts 32–34 such that a bond is formed between the melted posts and the board 14.

The particular construction of the guide members 31a and 31b and the number and placement of the positioning pins 32–34 in the holder 16 of FIGS. 3A–3D is exemplary only as other configurations and constructions may be used to accomplished the same function of securely affixing the sensor board 12 to the holder 16 with a known orientation.

Also extending in a direction opposite to that of projections 30 are securing members 36a and 36b. Each securing member 36a and 36b comprises an outwardly extending portion that defines a bore and a saddle member 39. As discussed in more detail below, securing members 36a and 36b are used to firmly secure the holder 14 to the stator 22. For many applications, the press-fit formed by the nesting of the projections 30 within the slots of the stator 22 will adequately hold the holder 14 to the stator 22 such that the securing members 36a and 16b can be eliminated.

FIG. 3B illustrates a view of holder 14 form the perspective indicated by the 3B arrow in FIG. 3A. FIG. 3B more clearly illustrates the nature of the two projections 30'. FIG. 3C illustrates a side view of holder 14 taken from the perspective indicated by arrow 3C in FIG. 3A. FIG. 3C more clearly illustrates the construction of securing member 36a. Securing member 36a, obscured in the view of FIG. 3C, is constructed as a "mirror image" of securing member 36b.

Figure 3D:
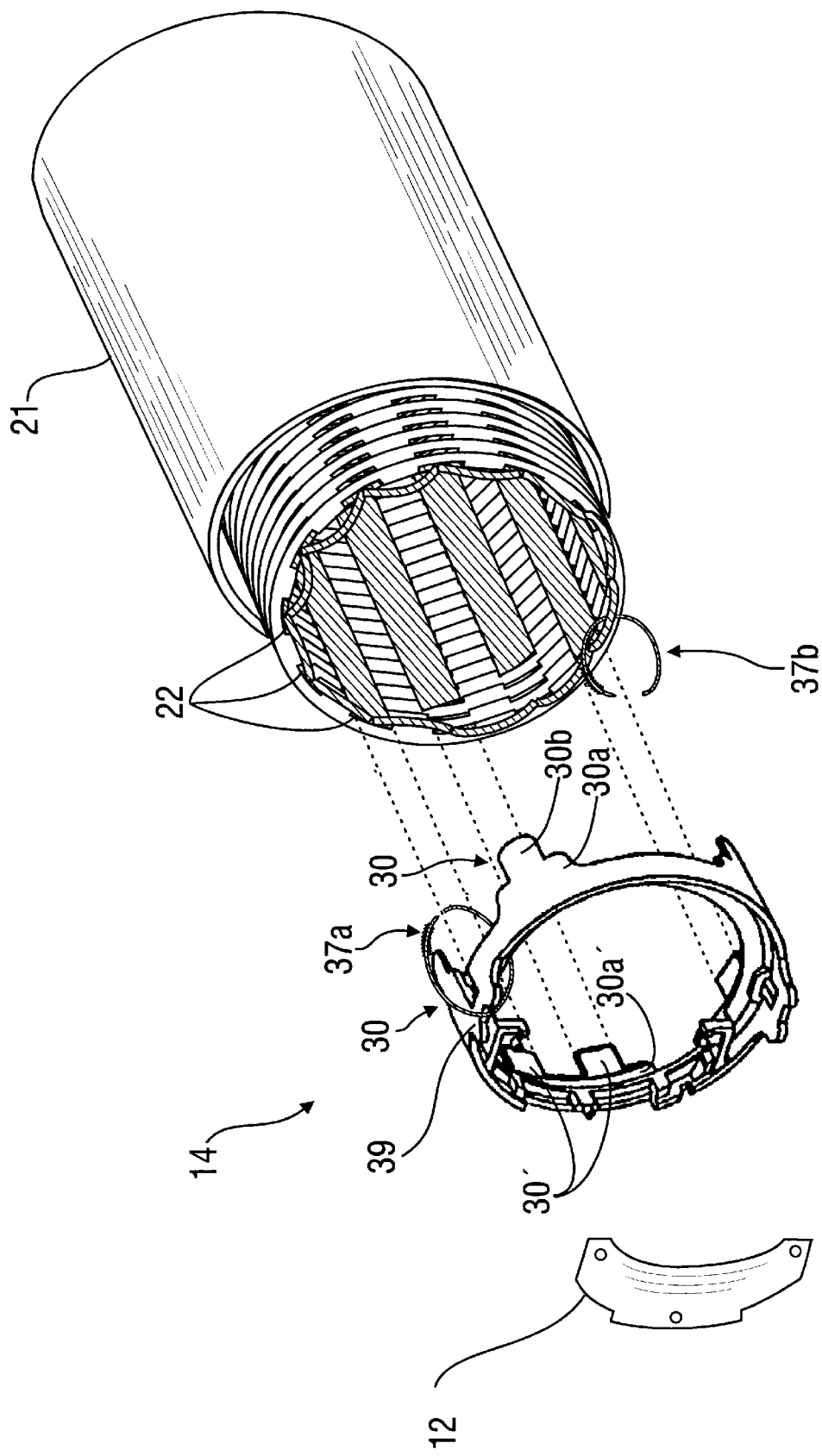

FIG. 3D illustrates in greater detail how the holder 14 is positioned with respect to the stator 22. In general the projections 30 and 30' of the holder 14 are received in the slots of the stator 22 in such a manner that the projections 30 rest on top of the coils 24 but within the corresponding slots formed by the inwardly projecting stator poles. Alternate embodiments are envisioned wherein other projections fit around the coils or between or among adjacent or non-adjacent slots. The dotted lines of FIG. 3D illustrate how the projections 30 fit within the slots of the stator 22. In the exemplary embodiment of FIG. 3D, the Mylar strips 24 or top sticks, are cut short in those slots that receive projections 30.

In the embodiment of FIG. 3D tie loops 37a and 37b are passed though the loops formed by the end-turns of two of the coils 23 and over the saddle members 39 defined by the securing members 36a and 36b. These tie loops 37a and 37b may be used to ensure that the holder 14 does not separate from the stator 22 during assembly or use of the machine, although in many applications the interference fit formed between the holder 14 and the stator 22 will be use that the tie loops 37a and 37b are unnecessary. Alternate embodiments are envisioned wherein the tie loops 37a/37b pass over the saddles 39 and through the bores defined by the securing member; or where the tie loops pass only through the bores defined by the securing members.

Because of the specific arrangement of the projections 30 and 30' of holder proper orientation of the holder 14 can with respect to the stator 22 is easily obtained when all of the projections 30 are positioned within stator slots. Moreover, because attachment of the holder 14 to the stator 22 is a relatively simply matter, this orientation of the holder 14—and thus the sensor board 12 and the sensors mounted thereon—to the stator can be accomplished in a relatively rapid and economical manner since sophisticated alignment techniques are unnecessary.

It should be noted that the specific construction of holder 14 illustrated and discussed above is exemplary only and that the construction of the holder 14 and, in particular, the number of projections can be changed without departing from the present invention. For example, with a reluctance machine having a different number of stator and rotor poles a different number of projections 30 may be necessary to ensure that a given holder/stator orientation is obtained when the holder is positioned within the stator. Alternately, the construction of the holder 14 may have to be adjusted if a machine that has slots different from that of a reluctance machine are used. For example, a machine may have skewed slots or oddly shaped slots which may require the use of specially configured projections 30. For "slotless" machines or machines for which it would be difficult to position a projection with a stator slots, embodiments are envisioned wherein a holder is provided that does not have projections like projections 30 but instead has securing members that may be attached to the stator via tie loops, like tie loops 37a and 37b, or other suitable means. Those of ordinary skill in the art having the benefit of this disclosure should be able to construct holders as described above without undue experimentation.

Still further embodiments are envisioned in which the sensor board holder does not form a complete circle that fits over the entire cross-section of the stator, such as holder 14 of FIGS. 3A–3D. For example, the holder may form a semi-, quarter, or other fraction of a circle as long as the holder is such that, when it is affixed to the stator, the holder has a fixed and known orientation with respect to the stator.

In the exemplary embodiment discussed above, it is significant that the sensor board 12 is mounted to the holder 14 which is affixed to the stator 22 within the portion of the motor housing that is enclosed by the end-shields of the motor (not illustrated). As such, the end-shield of the motor can be removed and the bearing structures 28a or 28b serviced without requiring disassembly or adjustment of the rotor position sensing system 10. Moreover, to the extent that there is any disturbance of the rotor position sensing system during assembly or servicing of the motor, the system can be easily and quickly reassembled in a proper fashion since no complex alignment or position methods of apparatus are required.

Figure 4A:
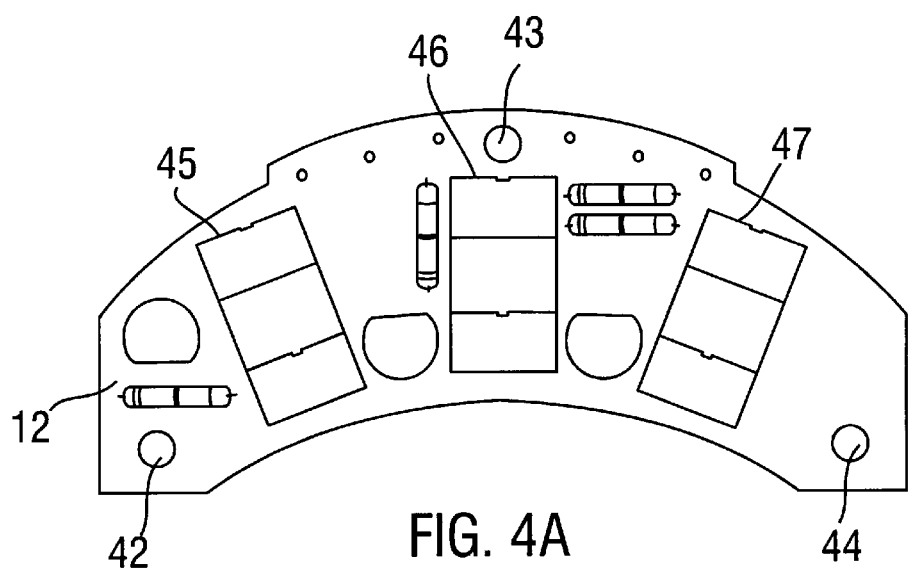
FIGS. 4A and 4B illustrate an exemplary construction of a sensor board in accordance with the present invention.
Figure 4B:
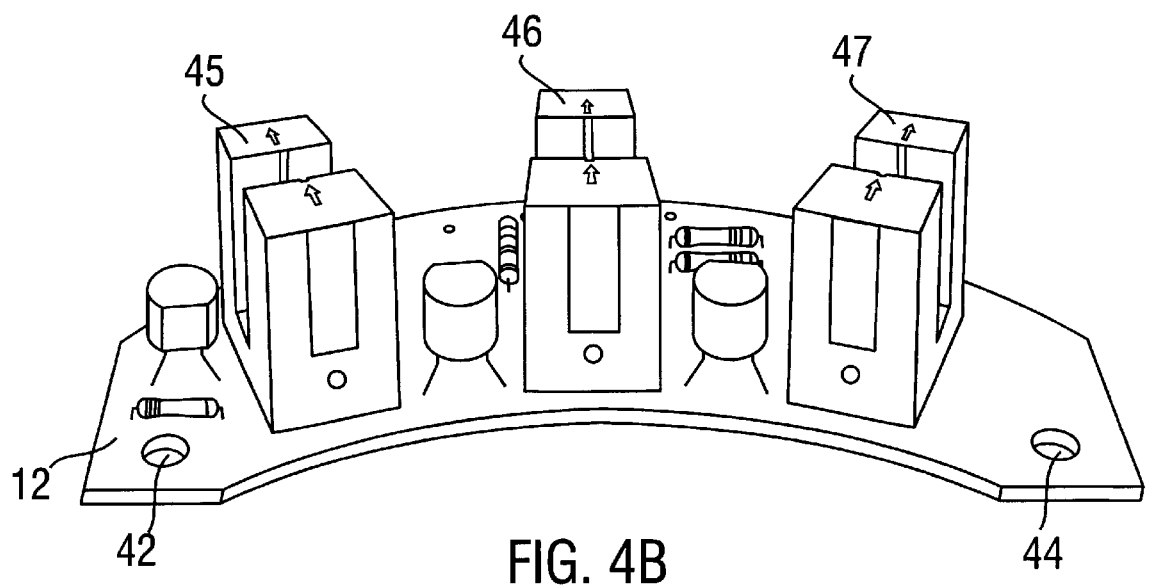

FIGS. 4A and 4B illustrate the sensor board 12 in greater detail. As illustrated in FIG. 4A, the sensor board 12 comprises a PC board of, for example, FR-4 construction, that is shaped to be received by the holder 14 and, in particular, by the guide members 31a and 31b of holder 14. The board 12 defines three holes 42, 43 and 44 which, as discussed above, are sized to receive the three positioning posts 32–34 of the holder 14. Three sensors 45, 46 and 47 are affixed to the sensor board and the electrical outputs of the sensors (not illustrates) are provided in a suitable fashion from the sensor board 12 to the electric circuitry which controls the motor (e.g., the phase energization circuitry or the position control circuitry). FIG. 4B illustrates an angled perspective view of the board 12.

In the exemplary embodiment of FIG. 4A and 4B, the sensors 45, 46 and 47 comprise optical sensors, such as the opto-sensors/photo-interrupters Model No. LTH-301-07 available from LITE-ON, which have a cut-out area through which the shutter teeth 19 of shutter 16 pass during normal operation of the motor. Depending on the orientation of the shutter teeth 19 with respect to the sensors 45, 46, 47, each sensor will provide a digital output (e.g., a logic 1 or 0) depending on whether a shutter tooth 19 is within the cut-out area for that sensor or not. Thus, the outputs from the three sensors 45, 46 and 47 provide digital signals that provides an indication of the angular position of the rotor 25 with respect to the stator 25.

The use of shutter teeth 19 and opto-sensors 45–47 is not essential to the present invention. Embodiments are envisioned where the shutter/sensor combination includes permanent magnet elements and hall devices, ferro-magnet members and reluctance sensors, mechanical type-sensing elements and other forms of sensors. The application of such sensors to the self-orienting system of the present invention should be apparent to one of ordinary skill in the art having the benefit of this disclosure.

The above description of several exemplary embodiments is made by way of example and not for purposes of limitation. Many variations may be made to the embodiments and methods disclosed herein without departing from the scope and spirit of the present invention. The present invention is intended to be limited only by the scope and spirit of the following claims.

We claim as our invention:

1. A rotor position sensing system for use with a rotating machine having a rotor, a stator, and end-shields that define a cavity within which the rotor and the stator are placed, the rotor position sensing system comprising:

a shutter adapted to be affixed to an end surface of the rotor of the rotating machine such that the shutter rotates with the rotor;

at least one sensor that is adapted to detect rotation of the shutter; and a sensor holder including a substantially circular portion, the sensor holder being coupled to the sensor, the sensor holder being adapted to be affixed to the stator of the rotating machine such that the sensor extends over the shutter;

wherein the shutter, the sensor and the sensor holder are adapted to be positioned within the cavity defined by the end-shields such that the sensor is positioned in a predefined position with respect to the stator independent of the placement of the end-shields.

2. The system of claim 1 wherein the rotor defines a plurality of outwardly extending rotor teeth, the sensor extending over the rotor teeth, and wherein the shutter comprises at least one pair of extending guide members, the pair of extending guide members defining a notch that is adapted to receive one of the rotor teeth.

3. The system of claim 1 wherein the rotor is affixed to a shaft, wherein the shutter defines a bore adapted to receive the rotor shaft, and wherein the shutter comprises tang members adapted to hold the shutter in a fixed relationship with the shaft when the shaft passes through the bore.

4. The system of claim 2 wherein the shutter comprises a plurality of pairs of extending guide members, where each pair defines a notch adapted to receive one of the rotor teeth and wherein the notches are positioned such that, when each notch receives a rotor tooth, the shutter is in a predetermined position with respect to the rotor.

5. The system of claim 1 wherein the stator defines a plurality of stator slots and wherein the substantially circular portion defines a plurality of projections, wherein the projections of the sensor holder are adapted to be nested within slots of the stator with at least some of the projections nested within non-adjacent slots to position the sensor holder with respect to the stator in a predetermined manner.

6. The system of claim 5 wherein the number of projections defined by the sensor holder is less than the number of slots defined by the stator.

7. The system of claim 1 wherein the sensor is coupled to a sensor board and wherein the sensor holder includes guide members for receiving the sensor board.

8. The system of claim 1 wherein the sensor is an optical sensor and wherein the shutter defines a plurality of shutter teeth that interact with the optical sensor.

9. A rotating machine system including:

a rotating machine having a motor housing, a stator positioned with the motor housing, the stator defining a bore, a rotating shaft positioned within the bore, a rotor affixed to the shaft, the rotor being positioned within the bore, and end-shields affixed to the motor housing, the end-shields and the motor housing defining a cavity that contains the rotor and the stator;

a shutter affixed to the shaft, the shutter being positioned within the cavity defined by the motor housing and the end-shields; and a sensor holder including a substantially circular portion, the sensor holder being affixed to the stator, the sensor holder including at least one sensor for interacting with the shutter to provide rotor position information, the sensor holder being affixed to the stator within the cavity defined by the motor housing and the end-shields such that the sensor extends into the bore and is positioned in a predefined position with respect to the stator independent of the placement of the end-shields.

10. The system of claim 9 further comprising at least one bearing structure coupled to the shaft of the rotor, the bearing structure being secured to the rotor in such a manner that the bearing structure holds the shutter to the rotor.

11. The system of claim 9 wherein the machine is a reluctance machine, wherein the stator of the reluctance machine defines a plurality of stator poles and inter-pole slots, and wherein the substantially circular portion defines at least three projections that are distributed generally about the periphery of the circular portion, the projections positioned within a plurality of the slots with at least some of the projections positioned within non-adjacent slots.

12. The system of claim 11 wherein the number of projections is less than the number of stator slots.

13. The system of claim 11 wherein at least two of the projections are arranged so as to form a notch therebetween, the notch having a width approximately that of a stator pole, and wherein placement of a predetermined stator pole within the notch places the sensor holder in a known position with respect to the stator.

14. The system of claim 11 wherein the sensor is coupled to a sensor board and wherein the sensor board is coupled to the sensor holder.

15. The system of claim 11 wherein the sensor board defines a plurality of holes and wherein the sensor holder comprises a plurality of positioning posts that are received by the holes.

16. The system of claim 11 wherein at least one tie loop is used to secure the sensor holder to the stator.

17. The system of claim 11 wherein the sensor is an optical sensor and wherein the shutter defines shutter teeth that interact with the optical sensor to break a light beam generated by the sensor.

18. A sensor holder for use in positioning a sensor in a known positional relationship with respect to a stator of a rotating machine, the rotating machine including a rotor that rotates about an axis of rotation and end-shields that define a cavity within which the stator and the rotor are contained, the sensor holder including:

means for affixing the sensor to the sensor holder including a sensor board containing the sensor, at least one guide member extending into the cavity defined by the end-shields in a direction perpendicular to the axis of rotation, and means for coupling the sensor board to the guide member including a post extending from the guide member that is received by the sensor board, and means for affixing the sensor holder to the stator including a substantially circular member that defines a plurality of projections that extend into the stator of the machine, the projections being positioned about the periphery of the circular member.

19. The sensor holder of claim 18 wherein the sensor is affixed to a sensor board and wherein the at least one guide member is integrally formed with the sensor holder, the at least one guide member adapted to receive the sensor board and orient the sensor board generally perpendicular to the axis of the stator.

20. The sensor holder of claim 18 wherein the stator defines a plurality of stator slots and wherein the plurality of projections are adapted to be received by the stator slots, with at least some of the projections received in non-adjacent stator slots.

21. The sensor holder of claim 20 wherein the projections are arranged such that placement of the projections within the slots of the stator orientates the sensor holder to the stator according to a known positional relationship.

* * * * *